US011511588B2

(12) United States Patent
Tao

(10) Patent No.: US 11,511,588 B2
(45) Date of Patent: Nov. 29, 2022

(54) ACTIVE CONTROL SYSTEM FOR VEHICLE SUSPENSIONS

(71) Applicant: Dongbei University of Finance & Economics, Liaoning (CN)

(72) Inventor: Yongming Tao, Liaoning (CN)

(73) Assignee: Dongbei University of Finance & Economics, Liaoning (CN)

( * ) Notice: Subject to any disclaimer, the term of this patent is extended or adjusted under 35 U.S.C. 154(b) by 23 days.

(21) Appl. No.: 17/381,625

(22) Filed: Jul. 21, 2021

(65) Prior Publication Data

US 2022/0063364 A1    Mar. 3, 2022

(30) Foreign Application Priority Data

Aug. 25, 2020 (CN) .......................... 202010862865.4

(51) Int. Cl.
*B60G 17/0165* (2006.01)
*B60G 17/016* (2006.01)
*B60G 17/015* (2006.01)

(52) U.S. Cl.
CPC ..... *B60G 17/0162* (2013.01); *B60G 17/0152* (2013.01); *B60G 17/0155* (2013.01); *B60G 17/0157* (2013.01); *B60G 17/0164* (2013.01); *B60G 17/0165* (2013.01); *B60G 2400/104* (2013.01); *B60G 2400/106* (2013.01); *B60G 2400/204* (2013.01); *B60G 2400/252* (2013.01); *B60G 2400/257* (2013.01); *B60G 2400/412* (2013.01); *B60G 2400/82* (2013.01); *B60G 2400/824* (2013.01); *B60G 2401/14* (2013.01); *B60G 2401/28* (2013.01); *B60G 2500/32* (2013.01)

(58) Field of Classification Search
CPC .......... B60G 17/0165; B60G 2400/104; B60G 2400/106; B60G 2400/204; B60G 2400/252; B60G 2400/257; B60G 2400/412; B60G 2400/82; B60G 2400/824; B60G 2401/14; B60G 2401/28; B60G 2500/32
USPC ...................................... 280/5.507
See application file for complete search history.

(56) References Cited

U.S. PATENT DOCUMENTS 5,058,017 A * 10/1991 Adachi ................. B60G 21/08
280/5.514
7,744,099 B2 * 6/2010 Holbrook ............. B60G 17/016
280/6.154

(Continued)

FOREIGN PATENT DOCUMENTS

DE    112017000979 T5 * 12/2018  ......... B60G 17/0164
DE    102017206908 B4 *  4/2019  ........... B60G 17/033

*Primary Examiner* — Toan C To
(74) *Attorney, Agent, or Firm* — Young Basile Hanlon & MacFarlane, P.C.

(57) ABSTRACT

An active control system for vehicle suspensions includes a detection module which detects a vehicle running state and a front road condition by means of an advanced mode or a standard mode; a calculation module which comprehensively calculates, in combination with running data and dimensions of a vehicle and the front road condition data collected by the detection module and according to passenger comfort requirements, target data of adjustment; and an implementation module which adjusts a height of each suspension of the vehicle according to the target data obtained by the calculation module.

6 Claims, 3 Drawing Sheets

(56) References Cited

U.S. PATENT DOCUMENTS

| | | | |
|---|---|---|---|
| 8,121,758 B2* | 2/2012 | Lu | B60T 8/1755 |
| | | | 280/5.506 |
| 8,155,835 B2* | 4/2012 | Holbrook | B60G 17/0521 |
| | | | 280/6.151 |
| 8,191,903 B2* | 6/2012 | Beuermann | B60G 17/052 |
| | | | 701/37 |
| 8,306,696 B2* | 11/2012 | Holbrook | B60G 17/01908 |
| | | | 356/138 |
| 9,223,302 B2* | 12/2015 | Maurer | H02P 29/60 |
| 9,908,379 B2* | 3/2018 | Guest | B60G 17/019 |
| 2014/0195114 A1* | 7/2014 | Tseng | B60G 17/0165 |
| | | | 701/1 |
| 2021/0178849 A1* | 6/2021 | Park | B60G 17/0525 |

* cited by examiner

```
┌─────────────────────────────────────────────────────────────┐
│ Calculate, according to a vehicle running speed and a        │
│ turning angle when the vehicle turns, turning acceleration   │
│ of the vehicle, or calculate, according to the turning       │
│ acceleration on the vehicle collected by the gyroscope       │
│ sensor, an inclination angle at which the vehicle needs to   │
│ incline inwards to overcome a centrifugal force              │
└─────────────────────────────────────────────────────────────┘
                              │
                              ▼
┌─────────────────────────────────────────────────────────────┐
│ Calculate, on the premise of considering reduction of an     │
│ inward inclination angle due to passenger seat encapsulation │
│ performance and acceleration generated by friction and       │
│ satisfying passenger comfort, a reduced inward               │
│ inclination angle                                            │
└─────────────────────────────────────────────────────────────┘
                              │
                              ▼
┌─────────────────────────────────────────────────────────────┐
│ Calculate, according to the dimensions and a wheelbase of    │
│ the vehicle, a distance by which an outer suspension needs   │
│ to be raised and a distance by which an inner suspension     │
│ needs to be lowered when the vehicle actually turns, so as   │
│ to obtain target data                                        │
└─────────────────────────────────────────────────────────────┘
```

FIG. 2

```
┌─────────────────────────────────────────────────────────────┐
│ Calculate, according to acceleration collected by the        │
│ gyroscope sensor when the vehicle accelerates or             │
│ decelerates, an inclination angle at which the vehicle needs │
│ to incline backwards during deceleration or an inclination   │
│ angle at which the vehicle needs to incline forwards during  │
│ acceleration                                                 │
└─────────────────────────────────────────────────────────────┘
                              │
                              ▼
┌─────────────────────────────────────────────────────────────┐
│ Calculate, on the premise of considering reduction of        │
│ forward and backward inclination angles due to passenger     │
│ seat encapsulation performance and acceleration generated    │
│ by friction and satisfying the passenger comfort, reduced    │
│ forward and backward inclination angles                      │
└─────────────────────────────────────────────────────────────┘
                              │
                              ▼
┌─────────────────────────────────────────────────────────────┐
│ Calculate, according to the dimensions and a wheelbase of    │
│ the vehicle, distances by which a front suspension needs to  │
│ be raised and a back suspension needs to be lowered when     │
│ the vehicle actually accelerates or decelerates, so as to    │
│ obtain target data                                           │
└─────────────────────────────────────────────────────────────┘
```

FIG. 3

ACTIVE CONTROL SYSTEM FOR VEHICLE SUSPENSIONS

CROSS-REFERENCE TO RELATED APPLICATION(S)

This patent application claims the benefit of and priority to Chinese Patent Application No. 202010862865.4, filed on Aug. 25, 2020, the disclosure of which is incorporated by reference herein in its entirety.

TECHNICAL FIELD

The present disclosure belongs to the technical field of vehicle control, and in particular to an active control system for vehicle suspensions.

BACKGROUND

An active suspension system of a vehicle is also known as an active guidance suspension system or a dynamic variable suspension system. The vibration and height of a vehicle body can be controlled by changing the height, shape and damping of the suspension system. The active suspension system is a novel suspension system controlled by computer, which originates in the 1950s and is developed in the past ten years. The active suspension system has the function of controlling the movement of the vehicle body. When a spring is deformed by braking, turning or load increasing of the vehicle, the active suspension system will generate a force against the inertial force to reduce the change of the position of the vehicle body.

The active suspension system of a vehicle can be divided into three types: a hydraulic suspension system, an air suspension system and an electromagnetic induction suspension system. An existing active suspension system can improve the vehicle riding comfort to a certain extent. With the air suspension system as an example, when a vehicle turns at a high speed, an air spring and a shock absorber of an outer wheel will be automatically hardened so as to reduce roll of the vehicle body; and when the vehicle is in emergency braking, an electronic module will strengthen the hardness of a spring and a shock absorber of a front wheel so as to reduce the inertial forward inclination of the vehicle body. Moreover, when the vehicle runs at a high speed, a suspension can be hardened to improve the stability of the vehicle body; and when the vehicle runs at a low speed for a long time, a control unit will determine the vehicle as driving through a bumpy road, so as to soften the suspension to improve the damping comfort.

The existing active suspension system solves the problem mainly by actively adjusting the hardness of the suspension. With an air suspension as an example, when a vehicle turns, although the hardness of the air spring and the shock absorber on an outer side is increased to control roll, that is an outward inclination angle of the vehicle body, roll of the vehicle body still exists when the vehicle turns; and when the vehicle sharply decelerates, although the hardness of the air spring and the shock absorber of the front wheel is increased to control a forward inclination degree, that is a pitch degree of the vehicle body, forward inclination of the vehicle body still exists when the vehicle brakes.

SUMMARY

Aiming at the defects in the prior art, the present disclosure provides an active control system for vehicle suspensions. By actively adjusting the height of each suspension of a vehicle, the system aims to solve the problem of inward inclination generated when the vehicle turns, the problem of backward inclination generated when the vehicle rapidly accelerates through active forward inclination, and the problem of forward inclination generated when the vehicle rapidly decelerates through active backward inclination.

In order to achieve the above purposes, the technical solution of the present disclosure is as follows:

an active control system for vehicle suspensions includes a detection module, a calculation module and an implementation module; where the detection module detects a front road condition by means of an advanced mode, or detects a vehicle running state by means of a standard mode;

the calculation module comprehensively calculates, in combination with running data and dimensions of a vehicle and the front road condition data collected by the detection module and according to passenger comfort requirements, target data of adjustment; and the implementation module adjusts, according to the target data obtained by the calculation module, a height of each suspension of the vehicle, such that a vehicle chassis has an inner side lower than an outer side to properly and actively incline inwards when the vehicle turns, the vehicle chassis has a front side lower than a rear side to properly and actively incline forwards when the vehicle rapidly accelerates, and the vehicle chassis has a front side higher than a rear side to properly and actively incline backwards when the vehicle rapidly decelerates.

Further, in the advanced mode, a camera is used for collecting information data of the front road condition, which includes flatness of a front road surface, an angle of a bend, and natural gradients in vertical and horizontal directions of a road surface.

Further, in the standard mode, a speedometer is used for detecting a vehicle speed, an angle of a steering wheel is used for detecting a vehicle turning angle, and a gyroscope sensor is used for collecting acceleration on the vehicle.

Further, the calculation module calculates, according to a vehicle running speed and a turning angle when the vehicle turns, turning acceleration of the vehicle, or calculates, according to the turning acceleration on the vehicle collected by the gyroscope sensor, an inclination angle at which the vehicle needs to incline to overcome a centrifugal force, calculates, on the premise of considering reduction of an inward inclination angle due to passenger seat encapsulation performance and acceleration generated by friction and satisfying passenger comfort, a reduced inward inclination angle, and then calculates, according to the dimensions and a wheelbase of the vehicle, a distance by which an outer suspension needs to be raised and a distance by which an inner suspension needs to be lowered when the vehicle actually turns, so as to obtain the target data.

Further, the calculation module calculates, according to acceleration collected by the gyroscope sensor when the vehicle accelerates or decelerates, an inclination angle at which the vehicle needs to incline backwards during deceleration or an inclination angle at which the vehicle needs to incline forwards during acceleration, calculates, on the premise of considering reduction of forward and backward inclination angles due to passenger seat encapsulation performance and acceleration generated by friction and satisfying the passenger comfort, reduced forward and backward inclination angles, and then calculates, according to the dimensions and a wheelbase of the vehicle, distances by which a front suspension needs to be raised and a back suspension needs to be lowered when the vehicle actually accelerates or decelerates, so as to obtain the target data.

Further, the implementation module adjusts the height of the suspensions of the vehicle to be the target data by means of the hydraulic suspension system, the air suspension system, or the electromagnetic suspension system, such that the vehicle chassis has an inner side lower than an outer side to properly and actively incline inwards when the vehicle turns, the vehicle chassis has a front side lower than a rear side to properly and actively incline forwards when the vehicle rapidly accelerates, and the vehicle chassis has a front side higher than a rear side to properly and actively incline backwards when the vehicle rapidly decelerates, thereby improving the riding comfort.

The present disclosure has the beneficial effects that through active control over the height of the suspensions, the vehicle chassis has an inner side lower than an outer side to properly and actively incline inwards when the vehicle turns, the vehicle chassis has a front side lower than a rear side to properly and actively incline forwards when the vehicle rapidly accelerates, and the vehicle chassis has a front side higher than a rear side to properly and actively incline backwards when the vehicle rapidly decelerates, such that the problems of roll, outward inclination and forward inclination when an existing vehicle turns, accelerates and decelerates are solved, and the vehicle riding comfort is improved. Even if the need for roll, or forward inclination, or backward inclination of the vehicle cannot be completely eliminated by adjusting the height of the suspensions, the current inclination situation can be partially relieved.

BRIEF DESCRIPTION OF THE DRAWINGS

FIG. 2 is a flow diagram of a calculation module during turning of a vehicle of the present disclosure;

FIG. 3 is a flow diagram of the calculation module during acceleration or deceleration of the vehicle of the present disclosure.

DETAILED DESCRIPTION

The present disclosure is described below with reference to the specific embodiments. It could be understood by a person skilled in the art that these implementations are merely used for describing the present disclosure, but do not limit the scope of protection of the present disclosure in any methods.

Figure 1:
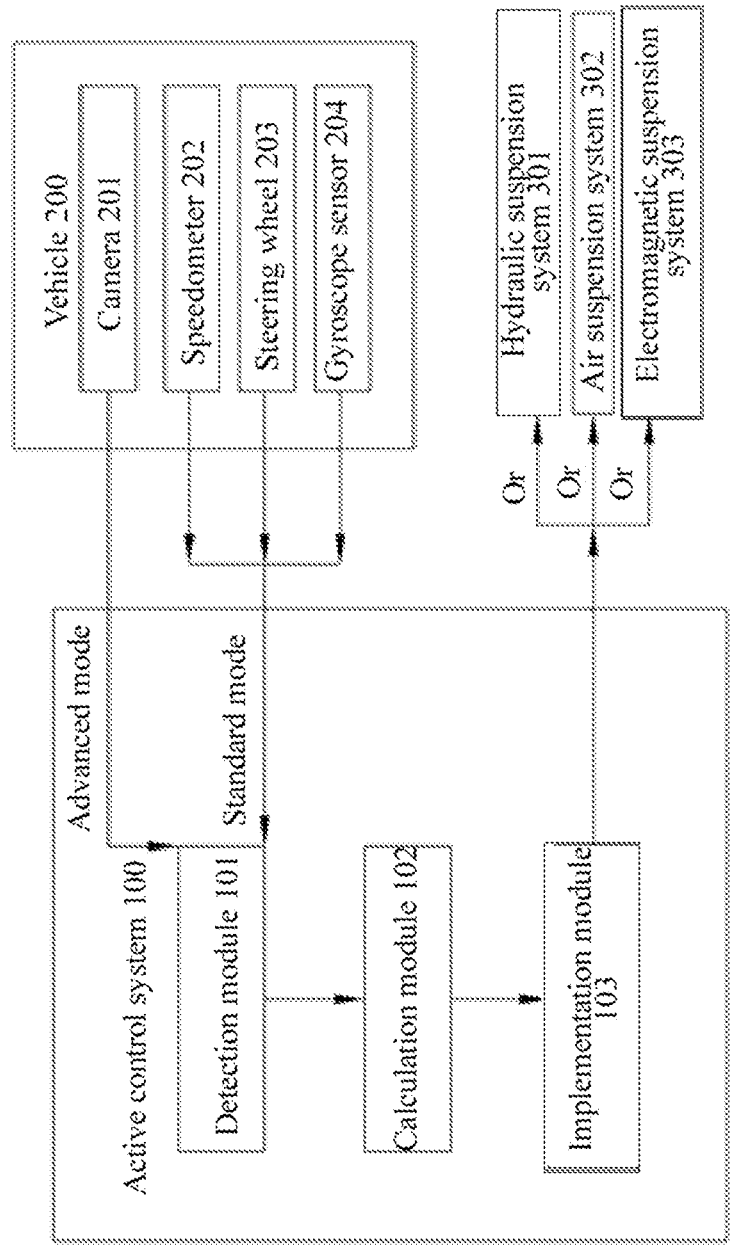
FIG. 1 is a block diagram of an active control system for vehicle suspensions of the present disclosure.

An active control system for vehicle suspensions 100, as shown in FIG. 1, includes: a detection module 101, a calculation module 102 and an implementation module 103.

The detection module 101 detects a front road condition by means of an advanced mode or detects a vehicle running state by means of a standard mode; In the advanced mode, the camera 201 arranged on the vehicle 200 is used for collecting information data of the front road condition, which includes flatness of a front road surface, an angle of a bend, and natural gradients in vertical and horizontal directions of a road surface; and in the standard mode, a speedometer 202 is used for detecting a vehicle speed, an angle of a steering wheel 203 is used for detecting a vehicle turning angle, and a gyroscope sensor 204 is used for collecting acceleration on the vehicle.

The calculation module 102 comprehensively calculates, in combination with running data and dimensions of a vehicle 200 and the front road condition data collected by the detection module 101 and according to passenger comfort requirements, a target height to which inner and outer suspensions need to be adjusted when a vehicle 200 turns, or target heights to which front and back suspensions need to be adjusted when the vehicle 200 accelerates and decelerates, or a target height of each suspension when the vehicle accelerates or decelerates on a bend.

The implementation module 103 adjusts, according to the target data obtained by the calculation module, the height of each suspension of the vehicle 200 by means of a hydraulic suspension system 301, or an air suspension system 302, or an electromagnetic suspension system 303, such that a vehicle chassis has an inner side lower than an outer side to properly and actively incline inwards when the vehicle 200 turns, the vehicle chassis has a front side lower than a rear side to properly and actively incline forwards when the vehicle 200 rapidly accelerates, and the vehicle chassis has a front side higher than a rear side to properly and actively incline backwards when the vehicle rapidly decelerates. According to a turning speed, a turning radius or a turning angle and other relevant factors, the most appropriate active inward inclination angle of the vehicle 200 is calculated, thereby improving the vehicle riding comfort.

An algorithm process of the calculation module 102 includes:

(1) as shown in FIG. 2, with vehicle turning as an example, calculate turning acceleration of the vehicle according to a vehicle running speed and a turning angle, or according to the turning acceleration on the vehicle collected by the gyroscope sensor, calculate an inclination angle at which the vehicle needs to incline to overcome a centrifugal force; on the premise of considering reduction of an inward inclination angle due to passenger seat encapsulation performance and acceleration generated by friction and satisfying the passenger comfort, calculate a reduced inward inclination angle; and then according to the dimensions and a wheelbase of the vehicle, calculate a distance by which an outer suspension needs to be raised and a distance by which an inner suspension needs to be lowered when the vehicle actually turns, so as to obtain target data; and (2) as shown in FIG. 3, with vehicle acceleration or deceleration as an example, according to the acceleration when the vehicle accelerates and decelerates collected by the gyroscope sensor, calculate inclination angles at which the vehicle needs to incline backwards during deceleration or incline forwards during acceleration; on the premise of considering the reduction of forward and backward inclination angles due to passenger seat encapsulation performance and the acceleration generated by friction and satisfying the passenger comfort, calculate reduced forward and backward inclination angles; and then according to the dimensions and the wheelbase of the vehicle, calculate distances by which a front suspension needs to be raised and a back suspension needs to be lowered when the vehicle actually accelerates or decelerates, so as to obtain the target data.

Figure 4A:
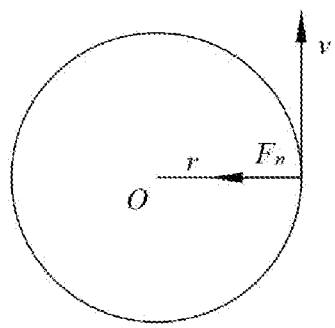
FIGS. 4(a) and 4(b) are calculation model diagrams of the calculation module of the present disclosure.
Figure 4B:
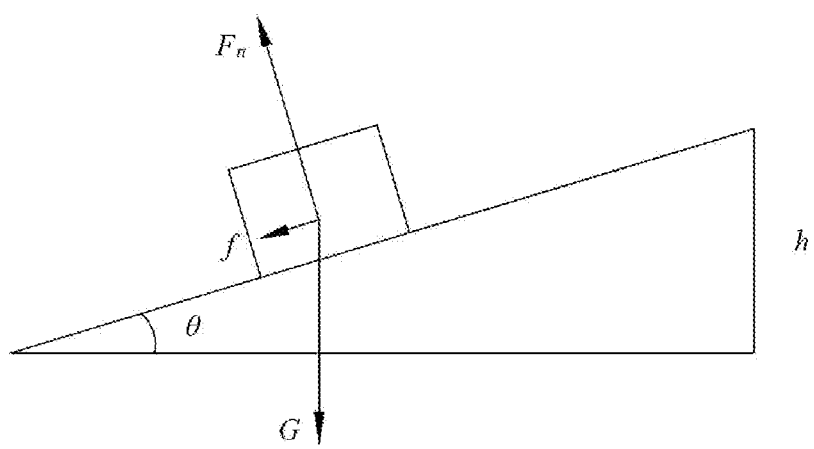

With vehicle turning as an example, the calculation module basically includes:

1) obtain various data by means of a detection module;

2) as shown in FIG. 4 (a), calculate a current turning radius r of the vehicle according to a vehicle speed v collected in the standard mode, a turning angle of a vehicle steering wheel and the vehicle dimensions, and calculate centripetal acceleration on the vehicle according to the formulas $F_n = mrw^2 = mv^2/r$ and $a_n = F_n/m = rw^2 = v^2/r$; or 3) directly measure the centripetal acceleration $a_n$ on the vehicle by the gyroscope sensor, and divide the centripetal acceleration by the gravity acceleration g to obtain a value g of the acceleration, that is, how many g the acceleration has;

4) as shown in FIG. 4 (b), through force analysis of an object on a slope, obtain a value f of a friction force applied to the object on the slope with an angle θ, and convert the value f into the value g (that is, obtain the centripetal acceleration by inclining an angle of the vehicle chassis), where f=m·g·sin θ and a=g·sin θ;

5) take a middle part of a wheel axle as a fixed point, with raised distance Δh of the outer suspension of the vehicle and lowered distance Δh of the inner suspension of the vehicle as examples, under the condition that the angle θ is not too large, Δh=l/2·sin θ, where l is a length of the wheel axle, that is the wheelbase;

6) by increasing the height of the outer suspension and decreasing the height of the inner suspension, make the inclination centripetal acceleration a equal to the turning centripetal acceleration $a_n$, i.e. Δh=(a/g)·(l/2), and calculate the height by which the suspensions need to be changed;

7) under the situations of considering the seat friction force and $a_n'$ that a passenger can bear without affecting comfort, reach Δh without adjusting the height, that is, Δh=((a−$a_n'$)/g)·(l/2), which can reduce the height by which the suspensions need to be adjusted. For example, if the acceleration required during acceleration and deceleration of the vehicle is 0.2 g and the wheelbase l of the vehicle is 2.0 m, then Δh shall be 1.0×0.2=0.20 m; and if the $a_n'$ that the passenger can bear is 0.1 g, then Δh shall be 1.0× (0.2−0.1) =0.10 m.

With vehicle acceleration and deceleration as an example, the above method can also be used for calculation. For example, when the acceleration required during acceleration and deceleration of the vehicle is 0.2 g, and the wheelbase $l_0$ of the vehicle is 2.8 m, then Δh shall be 1.4×0.2=0.28 m, and if the $a_n'$ that the passenger can bear is 0.1 g, then Δh shall be 1.4× (0.2−0.1)=0.14 m.

As further consideration, the vehicle accelerates or decelerates while turning, for example, the vehicle decelerates when entering the bend and accelerates when leaving the bend is further considered; and the height adjustment requirements of the inner and outer suspensions during turning and the height adjustment requirements of the front and rear suspensions during acceleration and deceleration are considered at the same time.

As further consideration, due to the differences of the bearable $a_n'$ and comfort requirements of different passengers further considered, the value of $a_n'$ can be adjusted between 0-0.1 g.

As further consideration, with vehicle turning as an example, it is not necessary to keep the middle point of the wheelbase as a fixed height, raise the outer suspension and lower the inner suspension, and the position of a fixed height point can be set by considering the comfort requirements of different passengers, for example, the height of an inner side is fixed and only the height of the outer suspension is increased, or the height of an outer side is fixed and only the height of the inner suspension is decreased, or the fixed height point is set at a position between the inner side and the outer side and the height of the inner and outer suspensions is adjusted according to the calculated target data.

As further consideration, road surfaces have natural gradients in upslope or downslope, some road surfaces (straight roads or bends) are paved in transverse gradients (with inner sides higher than outer sides) for convenient drainage, and some bends are paved with inner sides lower than outer sides inclined towards the inner sides of the bends for increasing the turning stability of vehicles. In the advanced mode of the present disclosure, the flatness and gradient information of the road surfaces are collected in advance by means of the camera, or in the standard mode, by means of the gyroscope sensor, the natural gradient θ' of the road surface is detected and calculated, and the natural gradient θ' shall be added to calculation of the target height of the suspensions when the vehicle turns, accelerates or decelerates.

During actual project implementation, learning, memorization and adjustment shall be carried out through a machine learning function of an electronic control unit (ECU), so as to obtain the target height of suspension adjustment when the vehicle specifically turns, accelerates or decelerates, such that adjustment data of the whole suspension height adjustment function needs to be practically tested and debugged.

What is claimed is:

1. An active control system for vehicle suspensions, comprising a detection module, a calculation module and an implementation module,
    wherein the detection module detects a front road condition by means of an advanced mode or detects a vehicle running state by means of a standard mode;
    in combination with running data and dimensions of a vehicle and the front road condition data collected by the detection module and according to passenger comfort requirements, the calculation module comprehensively calculates a target height to which inner and outer suspensions need to be adjusted when a vehicle turns, or target heights to which front and back suspensions need to be adjusted when the vehicle accelerates or decelerates, or a target height of each suspension when the vehicle accelerates or decelerates on a bend; and
    according to target data obtained by the calculation module, the implementation module adjusts a height of each suspension of the vehicle by means of a hydraulic suspension system, an air suspension system, or an electromagnetic suspension system, such that a vehicle chassis has an inner side lower than an outer side to properly and actively incline inwards when the vehicle turns, the vehicle chassis has a front side lower than a rear side to properly and actively incline forwards when the vehicle rapidly accelerates, and the vehicle chassis has a front side higher than a rear side to properly and actively incline backwards when the vehicle rapidly decelerates.

2. The active control system for vehicle suspensions according to claim 1, wherein in the advanced mode, a camera is used for collecting information data of the front road condition, which comprises flatness of a front road surface, an angle of the bend, and natural gradients in vertical and horizontal directions of a road surface.

3. The active control system for vehicle suspensions according to claim 1, wherein in the standard mode, a speedometer is used for detecting a vehicle speed, an angle of a steering wheel is used for detecting a vehicle turning angle, and a gyroscope sensor is used for collecting acceleration on the vehicle.

4. The active control system for vehicle suspensions according to claim 1, wherein the calculation module calculates, according to a vehicle running speed and a turning angle when the vehicle turns, turning acceleration of the vehicle, or calculates, according to the turning acceleration on the vehicle collected by the gyroscope sensor, an inclination angle at which the vehicle needs to incline inwards to overcome a centrifugal force, then calculates, on the premise of considering reduction of an inward inclination angle due to passenger seat encapsulation performance and acceleration generated by friction and satisfying passenger comfort, a reduced inward inclination angle, and then calculates, according to the dimensions and a wheelbase of the vehicle, a distance by which an outer suspension needs to be raised and a distance by which an inner suspension needs to be lowered when the vehicle actually turns, so as to obtain the target data.

5. The active control system for vehicle suspensions according to claim 1, wherein the calculation module calculates, according to acceleration collected by the gyroscope sensor when the vehicle accelerates or decelerates, an inclination angle at which the vehicle needs to incline backwards during deceleration or an inclination angle at which the vehicle needs to incline forwards during acceleration, calculates, on the premise of considering reduction of forward and backward inclination angles due to passenger seat encapsulation performance and acceleration generated by friction and satisfying the passenger comfort, reduced forward and backward inclination angles, and then calculates, according to the dimensions and a wheelbase of the vehicle, distances by which a front suspension needs to be raised and a back suspension needs to be lowered when the vehicle actually accelerates or decelerates, so as to obtain the target data.

6. The active control system for vehicle suspensions according to claim 1, wherein the implementation module adjusts a height of each suspension of the vehicle to the target data by means of the hydraulic suspension system, the air suspension system, or the electromagnetic suspension system, such that the vehicle chassis has an inner side lower than an outer side to properly and actively incline inwards when the vehicle turns, the vehicle chassis has a front side lower than a rear side to properly and actively incline forwards when the vehicle rapidly accelerates, and the vehicle chassis has a front side higher than a rear side to properly and actively incline backwards when the vehicle rapidly decelerates, thereby improving riding comfort.

* * * * *